(12) United States Patent
Xu

(10) Patent No.: US 8,503,340 B1
(45) Date of Patent: Aug. 6, 2013

(54) WIFI PHONE SYSTEM

(75) Inventor: Yongyong Xu, Sunnyvale, CA (US)

(73) Assignee: Yongyong Xu, Sunnyvale, CA (US)

( * ) Notice: Subject to any disclaimer, the term of this patent is extended or adjusted under 35 U.S.C. 154(b) by 1175 days.

(21) Appl. No.: 10/710,436

(22) Filed: Jul. 11, 2004

(51) Int. Cl.
*H04B 7/00* (2006.01)

(52) U.S. Cl.
USPC .......................... 370/310; 370/913; 455/557

(58) Field of Classification Search
USPC ................ 370/310, 320, 335, 342, 352–357, 370/395.21, 395.52, 395.65, 401, 441, 908, 370/910, 912, 913, 211; 455/3.01–3.05, 455/412.1, 555, 556.1, 556.2, 557, 452.2, 455/435.1; 709/226; 705/26
See application file for complete search history.

(56) References Cited

U.S. PATENT DOCUMENTS

| | | | | |
|---|---|---|---|---|
| 4,977,556 A * | 12/1990 | Noguchi | ........................ | 370/400 |
| 5,249,185 A * | 9/1993 | Kanno et al. | .................. | 370/465 |
| 5,469,496 A * | 11/1995 | Emery et al. | ................... | 455/461 |
| 5,615,210 A * | 3/1997 | Kaiyama et al. | .............. | 370/389 |
| 5,745,850 A * | 4/1998 | Aldermeshian et al. | ....... | 455/417 |
| 6,223,291 B1 | 4/2001 | Puhl et al. | ...................... | 713/201 |
| 6,342,901 B1 | 1/2002 | Adler et al. | .................... | 345/700 |
| 6,363,411 B1 | 3/2002 | Dugan et al. | .................. | 709/202 |
| 6,370,381 B1 | 4/2002 | Minnick et al. | ............... | 455/445 |
| 6,542,481 B2 | 4/2003 | Foore et al. | .................... | 370/329 |
| 6,580,704 B1 | 6/2003 | Wellig et al. | .................. | 370/338 |
| 6,600,734 B1 | 7/2003 | Gernert et al. | ................ | 370/352 |
| 6,625,166 B2 * | 9/2003 | Tsukamoto et al. | .......... | 370/466 |
| 6,640,248 B1 | 10/2003 | Jorgensen | ..................... | 709/226 |
| 6,643,260 B1 | 11/2003 | Kloth et al. | ................... | 370/235 |
| 6,643,504 B1 | 11/2003 | Chow et al. | ................... | 455/411 |
| 6,657,568 B1 | 12/2003 | Coelho et al. | ................... | 341/60 |
| 6,657,981 B1 | 12/2003 | Lee et al. | ....................... | 370/331 |
| 6,665,536 B1 | 12/2003 | Mahany | ......................... | 455/434 |
| 6,671,284 B1 | 12/2003 | Yonge, III et al. | ............ | 370/462 |
| 6,681,259 B1 | 1/2004 | Lemilainen et al. | .......... | 709/250 |
| 6,728,239 B1 | 4/2004 | Kung et al. | .................... | 370/352 |
| 6,862,622 B2 * | 3/2005 | Jorgensen | ..................... | 709/226 |
| 6,928,289 B1 * | 8/2005 | Cho et al. | ................... | 455/452.2 |
| 7,260,383 B1 * | 8/2007 | Ngan | .......................... | 455/412.1 |
| 2002/0068543 A1 | 6/2002 | Shah | ............................. | 455/351 |
| 2002/0114317 A1 * | 8/2002 | Dorenbosch et al. | ......... | 370/352 |
| 2002/0191557 A1 | 12/2002 | Chow | ............................ | 370/329 |
| 2003/0040332 A1 | 2/2003 | Swartz et al. | .............. | 455/553.1 |
| 2003/0083024 A1 | 5/2003 | Richenstein et al. | ........... | 455/99 |
| 2003/0172375 A1 | 9/2003 | Shaw et al. | ........................ | 725/9 |
| 2003/0227912 A1 | 12/2003 | Kachi | ............................ | 370/352 |
| 2004/0005914 A1 | 1/2004 | Dear | ............................ | 455/563 |
| 2004/0013135 A1 | 1/2004 | Haddad | ........................ | 370/493 |
| 2004/0023652 A1 | 2/2004 | Shah et al. | ................. | 455/426.2 |
| 2004/0078274 A1 * | 4/2004 | Aarnio | ............................ | 705/26 |
| 2004/0082330 A1 | 4/2004 | Marin | ............................ | 455/438 |
| 2004/0198355 A1 * | 10/2004 | Kim et al. | .................. | 455/435.1 |

\* cited by examiner

*Primary Examiner* — Andrew Lai
*Assistant Examiner* — Leon Andrews

(57) ABSTRACT

A voice communication system over WiFi 802.11 network includes: WiFi phone devices, subscription servers and wireless access points. Through voice and data gateways the system can transfer both voice and data streams through WiFi; Phone devices with both wired and WiFi wireless interfaces can automatically switches between wired network and wireless network through WiFi access points. Subscription server maintains the current status of each device every time it changes location. Voice packets are prioritized over regular data packets and dispatched to different network interface by smart packet dispatcher. Quality of service for voice conversation over WiFi is achieved by various methods: piggy-tail method and ACK enhancements and other improvements to reduce delay and latency of real time voice packets.

41 Claims, 5 Drawing Sheets

WiFi Phone System

Smart Packet Dispatcher in WiFi Phone

Piggy-tail voice packets to improve throughput

Fig. 4a Normal transfer a realtime voice oacket after regular data packet

Fig. 4b Piggytail real-time voice packet with regular data packet

Intelligent ACK/NACK enhancement

Fig. 5a Normal ACK in 802.11 protocol for transferring regular data packet

Fig. 5b Intelligent ACK/NACK for transferring voice packets

WIFI PHONE SYSTEM

BACKGROUND OF INVENTION

1. Field of Invention

This patent application relates to the field of wireless or mobile communication. In particular, with WiFi network and 802.11 network, PBX system, IP phone technology and cellular technology.

2. Prior Arts

US Patent application 20030083024 titled "Multiple channel wireless communication system" by Richenstein, Lawrence et al. on May 1, 2003 on is about Multiple channel wireless communication system for communicating a plurality of audio streams to remote devices, comprising a plurality of inputs for receiving a plurality of digital audio streams, a combiner connected to the inputs for combining control codes and the received audio streams in a predetermined format to form a signal wherein the control codes for controlling the operation of a remote device equipped for processing the signal to extract the audio streams in accordance with the predetermined format, and a transmitter connected to the combiner to transmit the signal for reception by the remote device.

That application uses control codes to control remote devices. In our invention, we do not use control codes, instead, we use existing digital network which is different from the system described in that application.

US Patent application 20020068543 by Shah, Hitesh on Jun. 6, 2002 discusses about "Sharing of wireless telephone services between a subscriber's personal wireless telephone and the subscriber's vehicular wireless telephone". The shared service may be a connectivity service, allowing the subscriber's personal wireless telephone to communicate directly with the subscriber's vehicular wireless telephone. Alternately, or additionally, the shared service may be one or more services provided by the wireless service agreement plan of the subscriber's vehicular wireless telephone or the subscriber's personal wireless telephone.

Although sharing is possible to be used in our system, our invention does not share service plan directly. Instead, the mobile device may select the best available ways for conducting service on different places.

U.S. Pat. No. 6,643,504 titled "Automatic wireless service activation in a private local wireless system" by Chow, et al. on Nov. 4, 2003 disclosed a method permitting individual wireless telephones (i.e., cellular) use of the wireless telephone's inherent downloading capability to permit automatic activation to achieve registration and activation to a secondary (i.e., private) wireless communication system (e.g., cellular system) by downloading directly into the wireless telephone the necessary system information.

That patent is about automatic activation while in our invention, activation is not our concern. (Assume users/phones are already activated) U.S. Pat. No. 6,665,536 by Mahany on Dec. 16, 2003 titled "Local area network having multiple channel wireless access" is directed to communication network that supports communication within premises. The communication network comprises an access point, a plurality of wireless roaming devices, a first wireless communication channel, and a second wireless communication channel.

The main difference between that patent from our invention is that it uses 2 wireless channels while in our system, one channel can be shared for both data and voice use. That patent also does not discuss how to do automatic switching between channels, nor does it mentioning the usage of the wired network through cradle.

U.S. Pat. No. 6,370,381 "Multiple channel communications system" by Minnick, et al. Apr. 9, 2002 is a multiple channel communications system for communications between a mobile units and dispatch agencies through tower sites under control of a multi-channel communication controller. The method of communications used is time division multiple access with provisions for alternate methods. The mobile units and dispatch agencies have forms of identifications to route messages between the mobile units and dispatch agencies according to the forms of identification. The forms of identification are resolved from one form to another to operate with the alternate methods of communications. The mobile units are handed off from one communications channel to another by the multi-channel controller as channel loading conditions exceed a predetermined limit. Mobile units change tower sites as the geographic coverage of a tower site changes.

That patent is more related to the time division communication network of cellular network use in existing mobile phone. It does not mention the usage of data network, in particular using the WiFi digital data network for voice. Also the base band station selections method is different from our automatic switching between communication methods.

U.S. Pat. No. 6,342,901 "Interactive device for displaying information from multiple sources" by Adler, et al. on Jan. 29, 2002 discusses that the user terminal, adapted for use in a system for receiving, analyzing, and managing diverse information obtained from a variety of source documents, is structurally mounted to a host structure, such as an electrical appliance or a wall, and receives its power parasitically from its host. The user interface is connected to a digital network via a communications link and receives information to display from a remote processor. The user interface terminal does not receive any data directly from its host.

That invention talks about how to get information and documentation from different sources and has nothing related to the voice communication.

In U.S. Pat. No. 6,728,239, Kung, et al. on Apr. 27, 2004 talks "Scaleable network server for low cost PBX". A scaleable PBX (Private Branch exchange) is provided for use in a powerful, facilities-based, broadband communications system that guarantees voice, data and video communication reliability and security to users for an multimedia system including integrated telephone, television and data network. The scaleable PBX includes one or more broadband gateways. Each broadband gateway may be provided on a slot card (i.e., broadband gateway card) compatible with servers and personal computers (PC). One or more slot cards may be include in a server to provide PBX feature/function capability to a broadband communication system. The server based broadband gateway PBX is scaleable for any size company or facility using, for example, one or more network servers. Alternatively, the broadband gateway card may be installed in a PC and provide a low cost small business or home PBX system.

That patent does not mention wireless network and how to make data and voice communications co-exist, nor does it mention methods to guarantee the quality of the service.

U.S. Pat. No. 6,580,704 by Wellig, et al. on Jun. 17, 2003 is about "Direct mode communication method between two mobile terminals in access point controlled wireless LAN systems". There is featured a Direct Mode (DM) communication method between two mobile terminals (MTs) in access point (AP) controlled WLAN systems. DM communication between the two MTs continues with exchange of information to conclusion when a MT identifying message is satisfactorily received by both MTs and when a MT identifying message of either MT is not satisfactorily received, DM communication setup is terminated.

That invention allows multiple devices communicate to each other directly in a WLAN system, but does not have component to talk with other public phones, nor does it cover the use of a mobile phone as a wired terminal for both data and voice communication.

U.S. Pat. No. 6,223,291 by Puhl, et al. on Apr. 24, 2001 titled "Secure wireless electronic-commerce system with digital product certificates and digital license certificates" provides a wireless electronic commerce system comprising a wireless gateway to a wireless network with which a wireless client having a unique client identifier is capable of communicating and at least one server couple-able to the wireless gateway, delivering content items to the wireless device and maintaining digital content certificates for content items and digital license certificates for licenses for the content items. The server maintains, for each wireless client associated with the system, a record of licenses for that client and a record of content items associated with each license.

This patent is mainly concerned with e-commerce and in particular, tracking wireless data for the purposes of billing the user. It focuses on long distance wireless e-commerce over the cell-phone network. There is no discussion of wireless devices or streaming voice over existing WiFi network or how to automatically switch to wired network when the WiFi phone is put on the cradle.

U.S. Pat. Application 20040005914 by Dear, Jean Paul on Jan. 8, 2004 titled "Wireless communicator with integral display" describes a personal communication device that is voice controlled and preferably includes a voice command pre-cursor.

That patent relates more to the voice recognition technology.

U.S. Pat. Application 20030172375 by Shaw, Norman S.; et al. on Sep. 11, 2003 titled "Wireless network and PDA system for sporting events" is relates to an apparatus and method for providing information to people in a captive audience, such as at a live sporting event, via a wireless computer network.

Though that patent application mentioned WiFi technology, it focuses on data communication and does not cover the combination of voice, data, or using such medium for phone communication.

U.S. Pat. No. 6,681,259 by Lemilainen, et al. on Jan. 20, 2004 disclosed a "Method for coupling a wireless terminal to a data transmission network and a wireless terminal". It provides a method for coupling a portable terminal in a flexible manner to a data transmission network, and for changing the data transmission connection used at a given time to another data transmission network when necessary, as well as to a portable terminal according to the method.

The purpose of that invention is to change data transmission connection on the fly. It is not a complete phone system and it does not discuss ways to ensure quality service for voice over WiFi wireless network.

U.S. Pat. No. 6,671,284 titled "Frame control for efficient media access" by Yonge, III, et al. on Dec. 30, 2003 is about A robust Media Access Control (MAC) scheme for network stations operating in an OFDM transmissions network. The MAC scheme uses robustly transmitted frame control information to ensure network synchronization (for media access) and convey channel access prioritization for QoS. Frame control information can occur in a frame before and after the frame's payload, or in a response.

Although our invention may also changes MAC layer for better control of media, it differs from that patent in that we no not add any new frame control information. Our method is an optimization over existing WiFi protocols.

U.S. Pat. No. 6,657,981 by Lee, et al. on Dec. 2, 2003 discloses a "System and method using packet filters for wireless network communication". A network communication system is provided for communicating a wired subnet and a wireless subnet to solve the handover problems occurred in roaming. The system includes an IAPP manager program at a user level of the access point for communicating with a kernel-level device driver using system calls to perform an announce procedure and a handover procedure. A wireless LAN card driver with a packet filter is implemented for sending signals to the IAPP manager program to perform the handover procedure upon receiving a re-association request packet from a mobile host.

In that patent, a wired LAN card driver is implemented for acting as an interface of the wired subnet. And a bridge program with a packet filter is implemented to increase the bandwidth efficiency. Although we also make use of both wired and wireless WiFi network interface, our focus is device while that patent claims for wireless access points by means of IAPP manager and packet filter.

U.S. Pat. No. 6,657,568 by Coelho, et al. on Dec. 2, 2003 is titled "Data packing for real-time streaming". To generate a data packing solution, there is a data structure to define data, and an encoder to encode a first update of data and a second update of data and to prepare for transmission the second update following the first update without regarding to a boundary associated with a predefined number of bits. In one embodiment, the predefined number comprises a byte. There can be a decoder to receive the first and second updates, to determine where the first update ends and the second update begins and to decode the updates.

In that patent, there can be a transmitter to stream the first and second updates. In another embodiment, the first and second updates are associated with financial market data. In another embodiment, the data structure comprises an XML file. It differs from our piggy-tail method where no update data packets are sent.

U.S. Pat. No. 6,640,248 by Jorgensen on Oct. 28, 2003 talks about "Application-aware, quality of service (QoS) sensitive, media access control (MAC) layer". It includes an application-aware resource allocator, where the resource allocator allocates bandwidth resource to an application based on an application type. The resource allocator schedules bandwidth resource to an IP flow, the resource allocator schedules bandwidth resource to an IP flow.

That patents uses resource allocator to allocate bandwidth resources and also uses different queuing mechanism; but it does not directly relates to WiFi wireless network, nor does it use multiple queues for separating data and voice packets.

U.S. Pat. No. 6,643,260 by Kloth, et al. on Nov. 4, 2003 disclosed a "Method and apparatus for implementing a quality of service policy in a data communications network". A content addressable memory (CAM or L3 Table) contains flow information for each active flow of packets passing through a given node of a data communications network. The CAM has associated with each entry (corresponding to each active flow) a packet counter, a byte counter, a token bucket and a contract value. Each flow is assigned one of a plurality of output queues and optionally at least one output threshold value. A token bucket algorithm is employed on each flow to determine whether packets from that flow exceed the contract value.

Since our invention does not specifically use CAM, packet counter or threshold, it is different from that patent.

U.S. Pat. No. 6,542,481 by Foore, et al. on Apr. 1, 2003 is about "Dynamic bandwidth allocation for multiple access communication using session queues". For example, when more users exist than channels, the invention determines a set of probabilities for which users will require channel access at which times, and dynamically assigns channel resources accordingly. Channel resources are allocated according to a buffer monitoring scheme provided on forward and reverse links between a base station and multiple subscriber units. Each buffer is monitored over time for threshold levels of data to be transmitted in that buffer. For each buffer, the probability is calculated that indicates how often the specific buffer will need to transmit data and how much data will be transmitted.

That patent targets providing high speed data service over standard wireless connections in existing cellular signaling network, such as Code Division Multiple Access (CDMA) systems. It is a more efficient allocation of access to existing CDMA channels. It is different from WiFi wireless network as those are not typical cellular network. Also it does not cover automatic switch between wired and wireless connection to achieve optimum voice quality.

U.S. Pat. No. 6,363,411 by Dugan, et al. on Mar. 26, 2002 titled "Intelligent network" is to perform intelligent call processing services for any type of call received at a resource complex or switching platform. There is an intelligent service platform having one or more nodes for providing intelligent call processing and service execution for a telecommunications switching network, the switching network having network elements for receiving telecommunications events requiring call processing services.

The service platform in that patent comprise: centralized administration system, a computing system integrated within a node for executing those business objects required to perform a service in accordance with an event received at the network element, a system integrated within a node for retrieving and storing selected business objects, and making the business objects and associated data available to the computing system when performing the service; a system integrated within a node for providing location-independent communication. That platform is a service platform for processing different business logic intelligently. It differs significantly from the scope of our system.

US patent application 20040023652 by Shah, Yogendra; et al. on Feb. 5, 2004 talks about "Wireless personal communicator and communication method". A personal communicator in the form of a wireless transmit/receive unit (WTRU) can communicate in multiple modes to provide user with seamless roaming, handover, and session continuity between multiple network or peer to peer communications. The WTRU has selectively operable transceiver components that are configured for wireless mobile network communications with mobile network base stations, wireless local network communications with local network base stations, and wireless peer to peer communications with other WTRU.

In that patent, various methods are provided utilizing the WTRU's multiple network communicating capabilities. Although in our system, there is automatic switch between wireless network and wired LAN, there is no peer to peer communications involved. One reason is that peer to peer network wastes the rare network bandwidth in WiFi system and may introduce more collisions or performance penalties.

US patent application 20040082330 by Marin, James Scott on Apr. 29, 2004 disclosed a "Method for handoff and redundancy using mobile IP". A method for handing off a mobile call via a packet data network uses mobile internet protocol (IP). When a mobile station enters a new area, it registers with a target base station. When a source base station determining a handoff is required, a handoff request message is transmitted to the home agent of the mobile station. The home agent then arranges for handoff between the source base station and the target base station via a packet data network.

That patent application is mainly for handoff operation in mobile phone which is not the focus of our invention. Of course, the method disclosed in that application may also be used in our system for handoff operation.

EPO patent CA2388986 titled "universal wireless gateway" (H04Q7/36; H04L12/66) on 2003-12-05, by Oosthuysen Herman, discloses a low-cost method and apparatus for co-locating Bluetooth and 802.11b in a single access point in which the most basic configuration based on the WNI universal access point is a base platform with a single USB peripheral expansion port. While a USB hub could be used to allow the attachment of multiple peripherals, the most basic configuration would be that of a single WiFi USB adapter attached to the base platform.

EPO patent WO2004045092 on 2004-05-27 by Shen Ying titled "interoperability and co-existence between two disparate communication systems" discloses how to Combine IEEE 802.11 (WiFi) and Bluetooth transceiver and method of operation employing busy signals to monitor when transmissions of each type are being transmitted or received, and employing a synchronizing signal to synchronize the use of time slots.

Both the two patents focus on co-locating Bluetooth and 802.11b in a single access point and has nothing related with voice.

U.S. patent application 2004013135 titled "System and method for scheduling traffic in wireless networks" on 2004-01-22 by Haddad Yoram disclosed a new transmission method for both voice and data packets as an enhancement of IEEE 802.11 protocol of wireless LAN network, which includes access point station (AP) and wireless stations. The method utilizes the transmission of standard beacon packets for embodying allocation information. The allocation information and transmission cycle are determined according to various criteria, among them packet's type and the traffic congestion. The transmitted allocation information includes scheduling information of reserved transmission periods for voice or data packets of both wireless and AP stations.

That patent is trying to introduce time slot used in GSM/CDMA to the existing 802.11 protocol which sacrifices the compatibility and is different from our method.

U.S. patent application 20030227912 titled "Voice packet preferential control equipment and control method thereof" on 2003 Dec. 11 by Kachi Seiji enables voice packet communication in a wireless LAN utilizing inexpensive LAN equipment not supporting QoS, such as preferential control, band control and so forth, and can realize preferential control of voice packet without modifying an existing wireless LAN access point not supporting QoS. In a case where voice packets are admixed in packet communication via the wireless LAN, when a round trip period becomes large, a voice packet preferential control equipment gives preference for voice packet transmission with interrupting data packet transmission to a wireless LAN access point in a valve in order to prevent deterioration of communication quality of the voice packet.

This patent discusses method to improved QoS in wireless LAN which is different from ours since it only use on WiFi networks while we utilize multiple connections.

U.S. Pat. No. 6,600,734 "Apparatus for interfacing a wireless local network and a wired voice telecommunications system" by Gernert, et al. on Jul. 29, 2003 disclosed an apparatus for interfacing a wireless local area network with a wide area, cellular or public switched telephone network including the function of a wireless LAN base station or access point, and a gateway. The interface may contain one or more different types of gateways, including a PSTN voice gateway, an analog modem gateway, and others. The apparatus may also include a well designed to receive the handset or mobile computer device to recharge the battery as well as to automatically transfer data when the phone or device is secured in the well.

This system does not contain subscription server that are used to allow mobile devices to freely moving in the network nor the device itself support both interfaces.

U.S. patent application 20030040332 titled "System for digital radio communication between a wireless LAN and a PBX" by Swartz, Jerome et al. on Feb. 27, 2003 disclosed a wireless local area network for digital radio communication between remote devices and a PBX telephone system, wherein the remote devices can access and use the voice message features in the PBX and the data bases on a host computer and servers. A wireless phone is provided for voice and data communication through the PBX or a CO telephone line with remote locations or the Internet using digital data packets and standard Internet Protocol. In a preferred embodiment of the invention, the remote device is a cash register comprising a bar code scanner and a phone. Radio communication between the register and a host computer is carried out over two channels, a first channel for data communication and a second channel for voice communication.

This patent application does not use either subscription server to solve the roaming problem nor does it relates to the possible QoS problems.

KR patent application KR2001000658 titled "Internet phone device of voice over internet protocol using wireless LAN and satellite Internet" on 2001-01-05 by Hwang Yong Un (KR) is also different from ours since we do not use satellite Internet.

US patent application 20020191557 titled "Broadband network with enterprise wireless communication system for residential and business environment" by Chow, Albert T.; et al. on Dec. 19, 2002 sets forth a network-centric service distribution architecture and method that integrates a wireless access system/service in the residence, SOHO, business or public environment through the use of a local broadband network, such as a Residential-Business Broadband Network (RBN), to the service provider's broadband transport network and to a service provider's broadband packet network that facilitates end-to-end packet telecommunication services.

CA patent CA2334213 titled "system and method for communicating voice and data over a local packet network" on 1999 Dec. 16 by Boucher Joe disclosed a system and method of communicating voice and data via a local packet network (LPN) (60) to and from a customer site (7). A remote digital terminal (RDT) (100) is provided at a customer site to interface a plurality of phone devices (10) and/or data devices (computer or LAN computers) (12) with the LPN via a local loop link, such as a Digital Subscriber Line or a wireless local loop (24).

The above two patents also allows voice over wireless local area network but does not specifically work on the WiFi 802.11 network.

BACKGROUND OF THE INVENTION

There have been different kinds of voice communication over wireless for decades. Simple ones include two-way radio over public shared channels or the 900M Hz, 2.4G Hz or 5.8G Hz cordless phones connecting base in a house. More complex ones are modern cellular phones using GSM, CDMA, TDMA or even 3G for connecting wireless mobile terminals to the cellular base station. Almost all of the networks utilize dedicated wireless channels for voice communication and are not capable or very expensive of handling data communications at all. For example, analog or RF wireless cannot directly support data over wireless while cellular networks only support very slow data connections.

On the other hand, WiFi networks, sometimes called Wireless LAN or WLAN, or 802.11 networks are gaining popularity through time. The low cost of the access point and device and ease of setup and usage are making more and more corporation and individuals starting to adapt this new technology. So far the wireless LAN is still local area data network as its range is limited (about 100 meters). Wireless phone network, on the other hand, is wide area network (WAN), typically uses cellular network, and trans-fers voice or limited data information only.

The combination of WiFi wireless technology and voice technology has come to the horizon for a while. Some vendors such as Cisco released IEEE 802.11b-compliant mobile devices that interoperate with other WiFi certified wireless LANs as well. Broad support of VoIP solutions from telephony vendors also allows cellular phone devices to integrate with WiFi network easier than before.

However, so called voice over wireless LANs (VoWLAN) is still in its infant stage and has many drawbacks that greatly limit its growth. The main reason is that the quality of voice over WiFi wireless is not as good as over wired phones or even over cellular network. The WiFi network or existing 802.11 protocol suites were originally designed only to carry data instead of real time voice packets. There are no Quality of Service (QoS) mechanisms built in the standard. Any surge in network traffic could disrupt voice calls easily since there is no prioritization treatment for voice packets. Until new standards coming out, there is no good solution.

Meanwhile, with the fast development of VoIP, traditional Voice over IP (VoIP) technology has also come to the wireless field. Some vendors of VoIP had also made VoIP software that can run on PDA (personal digital assistant) device through WiFi networks. Others are trying to make similar hardware device capable of transferring voice packets over 802.11 networks. However so far there are two challenges remain unresolved: One is how to seamlessly integrate such WiFi device with existing phone system, especially on roaming and the other is quality of voice.

To allow mobile devices retain connected to the same network while on move, some proposals also come up. One is mobile IP. The mobile IP (Internet Protocol) enables a mobile node to move to various points in an IP based network. The mobile node may change its physical link from one point to another without having to change its corresponding IP address. However, mobile IP requires that all connecting point the wireless device is connected know about the new mobile IP protocol. If user moves to a public hotspot that does not support mobile IP, this won't work the device cannot maintain the same IP address in this case.

This invention partially solves the problem by combining and merging the benefits of both wired and wireless communication over wireless LAN (WiFi) network. In practice, most of the time, the mobile device can act as a wired phone sitting on the cradle so it can take advantage of the high speed connections and gain the best voice quality. Only when user is moving, it becomes a mobile terminal connecting and directing all voice communication over WiFi wireless access point by the system automatically.

On the other hand, the main problem of transmitting real-time voice packets over WiFi wireless network is to ensure the quality. Because current WiFi standard—802.11b or 802.11g do not provide ways to prioritize packets or ensure quality services inside protocol, and the standards use distributed collection avoidance medium access, the voice quality over WiFi network are fairly bad compared with regular wired phone or cellular phone. Any real-time packets could suffer great problems over the network, such as long latency or data loss when network is busy or too many conflicts occur. This is also one of the reasons that voice over WiFi has not been widely adopted.

To solve this, one of the proposals is 802.11e coming from the 802.11 committee which try to add some QoS support to the 802.11 protocol. 802.11e has been discussed to introduce different priorities to the 802.11 packet and stations. In simplicity, the higher priority, the lower waiting time for sending. Though it is useful for some cases, it does not solve much of the problem. Furthermore, not only adopting new standards takes long time, as it requiring new WiFi chipsets and many changes in both device and access point, but also there are some arguments that the 802.11e does not improve a lot for real time communication. There is still long time before a real good solution for voice communication over WiFi network becomes standard and gets widely adopted.

If we review the internal time frame of 802.11 protocols, we may find that much time has been wasted during the transferring of packets. First, there is a back-off time specified for access point and station, which is used to specify a random time for two stations to wait before next try in case of collision. Range is fixed, but it should be smaller for real-time packets. Another shortcoming is that in 802.11 protocol, each 802.11 frame is companied by an ACK (acknowledge frame). This is useful on some occasions, but waste time in many other occasions.

Let's look at other timing issues. For example, typical 802.11b network transfers at 11M bps (bits per second). Typical TCP packet contains 1535 bytes. Transferring a 1536 bytes TCP packet requires 1,573 μs in total time. The actual data transfer takes: 1536/1.375 M Bps (Bytes per second) =1118 μs. The other time wasted is because in 802.11b, for each data packet to transfer, there is a 50 μs DIFS, and 192 μs ("long" preamble) and a 10 μs SIFS. Total is: 50+192+1118+ 10=1370 μs. In addition, for each 802.11 packet, there is an ACK packet with 14 bytes followed. The ACK packet takes 192 μs+14/1.375 M Bps=192+11 μs=203 μs. So the total is 1370+203=1573 μs.

While the transferring of actual data bytes for a TCP packet is only 1118 μs, we can see that the percentage of transferring useful data is only 71%. (1118/1573=0.71) while almost 30% of time are wasted. And if some TCP packet contains less data than the standard 1573 bytes, then the ratio of useful data are even much lower. For example, a TCP ACK packet uses 76 bytes, transferring 76 bytes takes 56 μs (76/1.375 M Bps=56) while the total time takes 511 μs (50 μs DIFS+192 μs long preamble+56 μs data+10 μs SIFS+203 μs 802.11 ACK=511).

Many multimedia packets are transferred using UDP instead of TCP since UDP has smaller header and less overhead. However, even when UDP is used for transferring voice packets, this does not improve much. The reason is that most voice packets are digitally compressed and are quite small compared with the long 1536 bytes TCP packet. For that reason, the ratio for useful data versus wasted time may be even smaller.

As an example, a typical GSM packet contains 65 bytes. When transferred by UDP, UDP header contains additional 8 bytes and IP header is 20 bytes. So the time for transferring voice data including UDP headers is (65+8+20)/1.375 M Bps=68 μs. And the total time is: 50 μs DIFS+192 μs (long preamble)+68 μs (UDP packet with 65 bytes voice data)+10 μs SIFS+203 μs ACK packet of 802.11 protocol=523 μs. The percentage of transferring useful data now drops down to 13% (68/523=0.13). Even if we do not count the 802.11 ACK packet—203 μs, the percentage is still 22% (68/306).

Based on the above analysis, transferring real-time voice packets is really costly in the current WiFi 802.11 protocol because too much time is wasted for additional headers, preamble or ACK. In a typical environment where many voice and data packets are mixed, such a waste is pretty high when many packets are quite small. For example, HTTP protocol used by browsers, FTP packets used for downloading files are quite small for each command. Also each TCP packet is accompanied by a small 76 bytes TCP ACK packet. All those small packets make the WiFi wireless network very crowded. This also increases the possibility for collision when multiple stations are working, which further lowers the total throughput.

Yoriko Utsunomiya, in paper titled "A Medium Access Control Protocol with Retransmission using NACK and Directional Antennas for Broadcasting in Wireless Ad-Hoc Networks", 2004/2 (http://aurum.cs.inf.shizuoka.ac.jp/~bandai/pdf/conference/international/ic012.pdf) talks a method to use NACK to improve throughput performance for transmissions of broadcast packets in 802.11. The method, called BACK, is used for broadcasting only and cannot be directly used for regular 802.11 transmissions nor can it be used for both good and bad connection conditions.

Hao Zhu, in paper "On Improving the Performance of IEEE 802.11 with Multi-hop Concepts", 2003 (http://www.c-se.psu.edu/~hazhu/icccn03.pdf) also mentioned using NACK in multi-hop relaying in 802.11 network, but same as previous paper, does not cover end-to-end transferring and cannot adapt itself according to the different conditions.

H.-L. Wang, A. Velayutham, "An SSCOP-based Link Layer Protocol for Wireless LANs", GLOBCOM "03, 2003/12, Vol 1, p. 453-457, proposed An SSCOP-based Link Layer Protocol for Wireless LANs, which does not use positive ACK frame to acknowledge the reception of data frames and uses Unsolicited Status (USTAT) control frame to the transmitter, when it detects a frame loss. But it does not use positive ACK frame to acknowledge the reception of data frames. Dzmitry Kliazovich of University of Trento in paper "A Delayed-ACK Scheme for MAC-Level Performance Enhancement of Wireless LANs", 2003 (http://dit.unitn.it/~klezovic/publications/DAWL_single_clmn_MONET.pdf) presented Delayed-ACK for Wireless LANs (DAWL), as an enhancement of the IEEE 802.11 MAC. Basically, it is a combination of the TCP Delayed-ACK scheme and some of the SSCOP concepts. It merges several ACK packets into one ACK packet and send it together. Those two methods tries to attack the ACK inefficiency in 802.11 but they do not distinguish the difference between real time voice packet and regular data packets, further, furthermore, they only works on good condition networks.

Even with the latest 802.11g or 802.11a which has much higher data rate and smaller preamble, only the transfer through put is improved. The extra overhead and waste are still the same. To improve the quality of service, this invention uses a piggy-tail method for appending real time packet to non-real time data packets, reducing those extra overhead and the latencies for real-time voice packets.

SUMMARY OF INVENTION

This invention discloses a system allowing phone calls over existing WiFi data network simultaneously. It can automatically switch between wired line and wireless network using the best communication medium at the time to improve users' experience. The system composes of: local area network (wired and WiFi wireless) connected to the Internet; WiFi enabled wireless device (mobile terminal); networked cradle connected to the local area network, typically Ethernet); WiFi access points, subscription (or registration) server; voice gateway connecting to external public phone network. The system can be used for corporations, office buildings, small business, retail stores, manufactures, finance institutes, schools, hospitals or even home businesses.

The WiFi phone device (wireless mobile terminal) is a smart phone device that is capable of handling both voice and data information concurrently. It also equips with two communication mechanisms. One is wired connection with the help of networked cradle or by device itself using POE (Power Over Ethernet). The other is WiFi wireless. Both connection types are capable of transferring data and voice at the same time to the rest of the system. When the cradle is used, it functions as both a charger and a network connector for wired LAN communication. Traditional cradle of PDA is only used for charging or connecting a PDA to PC through a serial or USB cable. The WiFi phone device can also contain built-in wired LAN connector so that a cradle is no longer necessary. The network connector can also be used for easily charging by using an unused line in the cable-so called POE (power over Ethernet). This makes the WiFi phone device truly Plug-and-Play and extremely easy to be used by the user.

When WiFi phone device is connected to wired network (either through cradle or its own network connector), it is similar to a fixed-line VoIP phone and directs all its data and voice packets to the wired network as this is much faster than wireless connection in most cases. When it is taken away from the cradle or unplugged from the network cable, it searches for the wireless access point for WiFi communication. By intelligently switching mode without user intervening, it gains the best quality of service wherever possible.

Each time WiFi phone device changes mode, either associates with a new access point, or connects back to wired network, it will send notification to the subscription server to update its current status, such as location, address or gateways or access point. The subscription server maintains a database to keep track of each WiFi phone device's current status in the network. The information includes the device's identity, current address, preferred connection settings such as bandwidth, capabilities such as codec it supports and gateway through which it could be reached. Once subscription information changes, all future connections will be conducted using more reliable or available network the device prefers. Other devices in the system, or servers such as voice gateway can also consult the subscription server to look up the device when there is an incoming call for that user.

Subscription is a step to make sure that the user (or the WiFi phone device he carries) can be reached or notified whenever there is an incoming call. As soon as the user moves to another location, such as gets off from work to home, the user can still connect to the corporate subscription server through Internet from the home network as long as the user subscribes to the corporate subscription server about his current address by sending a subscription packet. Voice calls are automatically redirected to user's most recent subscripted location automatically. By using the subscription method, virtually people can be reached anywhere with Internet connection.

When user wants to make a call, the terminal first sends the request to the voice gateway. The voice gateway looks up the request, and decides whether the destination resides on the local network or on a public telephone network. For local address, it consults the subscription server to find out address of the other local WiFi phone device and then sends a request to that device. From then on, these two devices can communicate to each other directly. For external phone numbers on a public telephone network or other remote network, now the voice gateway will dial to the public telephone number, and connect to the remote phone and then act as a proxy between the calling WiFi device and the remote phone.

Before user can receive a call, the terminal has to first subscribe to the subscription server. In addition to providing contact information such as current address, authentication may also be verified. Later, when voice gateway receives an external phone call to the internal user, it can query the subscription server to find out the latest routing information for the terminal and send the request to the terminal directly. Once the initial call setup is finished, the voice gateway functions as a pure proxy between the external phone and the WiFi phone in the internal network. Whether the WiFi phone device is connecting to the network using wired LAN or wireless network is not an issue.

There is a major difference for this approach from mobile IP. Mobile IP tries to issue device the same network (IP) address when it roams to different networks. While in this system, with the help of subscription server, the device may not get the same address on different networks if user moves, say from work to home, or from wireless network to wired network. The subscription server will keep track of all its latest location information such as IP or MAC address, or routing info such as access point each time the terminal changes its status.

Optionally, in the case the terminal is capable of connecting to the network in multiple connections, the system may use different connection for different type of communication. For example, when the terminal is put on the cradle, it can connect using wired LAN through cradle. But it may also connect to WiFi wireless network. In this case, the server may send real-time voice data packets through the fast wired network and other data packets through the slower WiFi network. Subscription server may maintain multiple connections and routing information for any terminal. It may also send routing information packet (RIP) to other gateways in the system to support such a "priority based routing".

WiFi phones within the same network can also call each other without going through the voice gateways. These are internal calls that can be conducted directly. Each time, one WiFi phone can lookup the address of the other, it can call them directly. Modern VoIP call setup protocols such as SIP can also be used during the process.

To improve quality of service for real-time packets, a method is used to piggy-tail real time packets with non-real time data packets to reduce the extra overhead, waste and latencies in the 802.11 protocol. This is because real time voice packets are typically recurring small packets that require immediate delivery. To distinguish those data packets from regular data packets, this system will set up two different queues to prioritize packets. Normally, queue for the voice packets have higher priority than regular data packets queue. During transmitting, software driver tries to empty the voice packet queue before processing the regular packet queue. Response time for voice packets is improved and quality of service is ensured.

The network driver can detect real time voice packets either by some predefined port such as RTP (real time transport packet) port number or DSCP (Differentiated Services Code Point) in IP header. For those packets, it appends to the real time voice queue and other packets to the regular queue. Of course, fairness can be achieved to process those regular data packet if they have been waiting for too long.

For higher priority voice packets, the access point or device may specify a smaller back-off time for collision. The back-off time is the time to wait in case of collision, which is a random time with a constant maximum value. Reducing a smaller range of random waiting time gives better opportunity for quicker transmission of high priority packets. For real time packets, after several retries, if they still cannot be delivered in time, they may be discarded and do not affect the whole voice conversation too much.

802.11 ACK can be postponed or even eliminated intelligently to reduce bandwidth usage. ACK packets in 802.11 are used to acknowledge success recipient of all packets since error rate in wireless world is much higher than wired network. However, in reality, errors are still rare. It is possible to send 802.11 ACK packets later in idle time if a large number of ACK timeout value can be specified. Another way is to send only NACK on errors instead of successfully eliminate the huge time used for ACK when connection condition is good or there are lots of small voice packets. Our intelligent way can balance the ACK and NACK technical in real time according to packets type, connection condition to achieve a better result for that situation. Of course, the situations that the other end is dead or connection is lost have to be taken care of.

In addition to the above simple changes, further improvement is also possible. Instead of starting a new 802.11 frame which takes too much overhead, we can also piggy-tail the voice packet with other regular TCP, UDP or IP packet and send them as one packet. So at the access point, if there is a real-time voice packet in the voice queue and an existing data packet is ready to send, we can piggy-tail the voice packet with the data packet and send them together. This greatly improves the performance of the WiFi network for both voice and data transmission. Furthermore, as long as the maximum frame size (2312 bytes) is not exceeded, this method is still compatible with existing 802.11 standards.

In order to have the above improvements implemented, it may be necessary to modify the MAC or network layer functions of the access point and the corresponding mobile devices. Some improvements can be implemented for only one end while others require both send/receive parts be modified. For example, reducing back-off time, using different queues for different priority packets can be implemented to one end only. In either case, backward compatibility with existing WiFi device or access point is maintained. It can be a good substitute before full real-time solution for 802.11 is widely adopted.

Others, such as changing ACK or using NACK require both sending and receiving parties understand the changes in the protocol. Piggy-tail packets requires the receiver to unpack the original two packets out from the one packet in one 802.11 frame, it requires some additional network layer logic for this reassembling work.

If access point has adopted those changes, to maintain backward compatibility with other standard WiFi device, those "enhanced terminals" and "standard terminals" need to be distinguished. Those enhanced terminal will send a special packet to the access point to turn on those enhancement features for real time packets. After that, all future communication between network access point and the enhanced WiFi phone device or terminal can take advantage of the improvements for real time voice packets.

Access points maintain a capability table for all devices to distinguish enhanced device and standard device. It continues to use standard 802.11b or 802.11g without enhancement for transmission regular data packets with existing standard 802.11 devices. To standard WiFi device, the access point behaviors as a standard 802.11 access point so that the compatibility is maintained. If there are any voice packets for those devices, they have to be sent via standard 802.11 protocols. No enhancements are available.

Furthermore, the reserved type and subtype fields in frame control field can be used to define the new frame types such as piggy-tail frames or NACK frames to minimize the modification to the current IEEE 802.11 standard.

For real time voice packets transferred between voice gateways and WiFi phone terminal through wired line, either directly or through cradle, there are many existing technology to ensure quality services in domain of VoIP such as RTP and RSVP. And the WiFi phones can support existing VoIP standard so it can compatible with any VoIP system when acting as a fixed-line phone. That is out of scope of this system.

DETAILED DESCRIPTION

Figure 1:
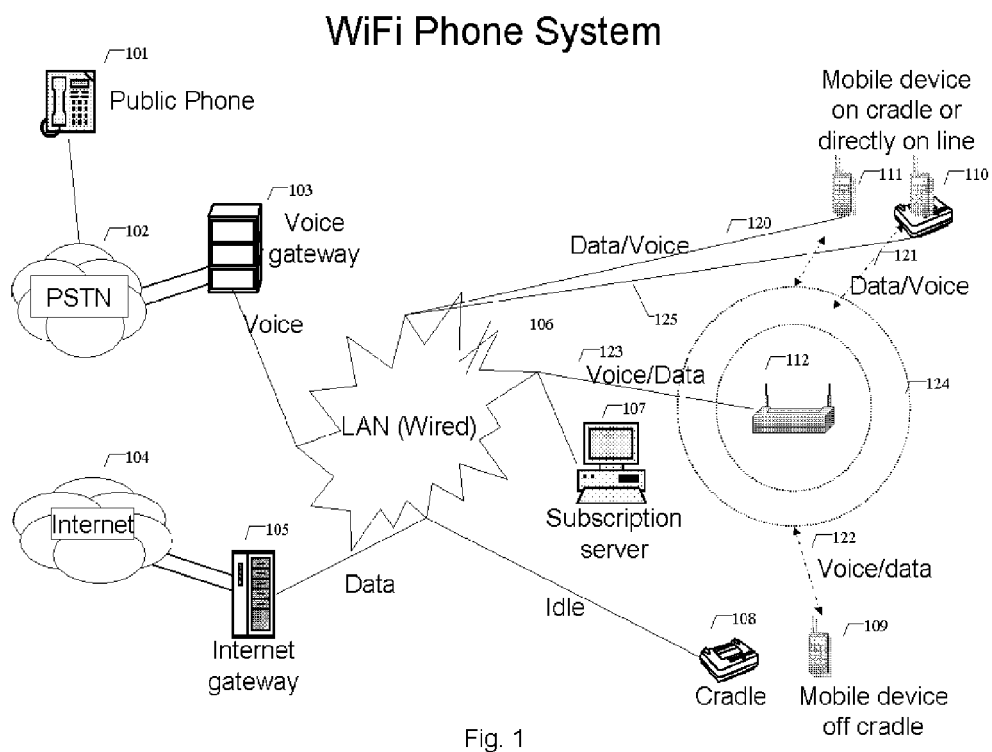
FIG. 1 illustrates the whole picture of the WiFi phone system.

FIG. 1 shows the overview of the WiFi phone system. In FIG. 1, (106) is the wired local area network (LAN) in a typical corporation or home. In this system, a regular network gateway for data access, typically an Internet gateway (105) is directly connected to both the wired LAN (106) and Internet (104) through which LAN users can connect to and browse the Internet. The local network (106) is extended to WiFi wireless domain by wireless gateways or access points (112). It also connects to the public telephone network by the voice gateway (103). This local area network is packet switched data network.

The most commonly used wired LAN (Local Area Network), including most companies or home networks are Ethernet which uses bus or star topology with CDMA/CA (Carrier Detection Media Access/Collision Avoidance) for media access. However, any other digital network can be used such as ATM or fiber network as long as they can transmit data packets using standard protocols such as TCP/IP and they can communicate with the WiFi 802.11 network through the access points. Furthermore, the wired interface can also be replaced by another wireless interface such as GSM, CDMA, 3G other cellular interfaces as long as it can provides an alternative reliable connection.

Compared with wireless network, its speed is relative high and much more reliable. Typical wired LAN speed, for instance Ethernet, ranges from at least 10M bps (bits per second) to 100 Mbps, while typical WiFi wireless network, such as 802.11b, is only 1M bps to 10 Mbps. Even the recent 802.11a or 802.11g supports up to 54M bps, the reliability of wireless network is still not as good as wired LAN. When such mixed system is used for transferring time-sensitive information such as voice, the bottleneck is on the wireless side.

Normal wired LAN only serves as a digital data network to connect each computer or workstation in the company together for information sharing. For typical company or homes, voice communications are provided by separate physical network such as wired phone network or cellular network. For example, in a home, phone lines are different from data cables. In a company, a separate PBX system must be installed to connect all phone cables to each corporate phone to allow employees to call each other using corporate PBX.

This obviously is a waste in the cable resource since each person has to have two sets of wires one data cable and one phone line. With the maturity of VoIP technology, reusing the existing data network to transfer voice are gaining popularity. Voice could have been transferred either internally or externally through the voice gateway (103). However, when users also want to be reached away from their desk, this traditional VoIP technology cannot help.

Mobility for computers or on data network can be resolved by introducing the WiFi wireless network to the wired LAN. By using a WiFi card to connect to the WiFi gateway or access point (112), laptops or other mobile devices such as PDA (personal digital assistant) can be reached when they are on move, such as in conference or meeting rooms. But voice communication does not benefit from it.

This system merges the two technologies together to get the best of the two so as both voice and data can be accessed from the same device, or mobile terminal, shown as (109, 110, 111), over the same set of connection, either wired or wirelessly, at the same time.

In the picture, the connections between mobile terminals and the network (120,121,122) are used to transmit both data packets and voice packets simultaneously.

The mobile terminals, or WiFi phones can use any mobile operating systems such as Palm OS, Windows CE, Symbian, embedded Linux or other mobile phone OS. As smart phones, they can also run mobile applications such as instant messenger, email, on-line chatting, calendar, or browser. Since the voice connection and data connections share the same network, those mobile applications can run even when voice calls are in process.

Voice gateway (103) connects to both Public Switched Telephone Network (PSTN) (102) and local area network (106). It can be either a VoIP PBX system or any proxy that can convert voices packets and signals between WiFi phones (109,110,111) in the LAN (106) and remote phones (101) in the public phone network (102). It also collects voice signals from PSTN and sends a custom voice packet to the WiFi phone over wired or wireless local network.

The voice gateway (103) can be as simple as a computer with its voice modem connects to the public phone line and its network card connected to the LAN. A special voice gateway software running all the time for the detection and conversions of voice signals and packets. Complicated voice gateway can be commercial PBX system that supports hundreds simultaneous conversation through the gateway or those provide advanced features such as voice mail, call holding, call waiting or conference call capabilities.

Typical VoIP systems are wired, with wired VoIP phones or terminals connected to the data network. There is not much VoIP software over wireless or WiFi network. Some VoIP software has been developed for PDA to connect to existing VoIP system, however, without good quality of service solutions, the results are not optimistic. Some existing VoIP solutions have failed to apply existing wired LAN QoS solutions such as RTP or RSVP to wireless network because they do not distinguish the difference between wireless networks from wired networks.

In this system, wireless access points or gateways (112) are bridges between wired LAN (106) and WiFi phones or smart terminals (109,110,111). They connect to LAN by network cables (123) and also communicate with standard WiFi devices through standard 802.11 wireless protocols (124), or the smart WiFi phone without QoS enhanced protocol described later. Standard WiFi devices such as laptop computer or person digital assistant (PDA) can still use the data network over those access points while the WiFi phones can utilize both data access and voice service within the network, or with external networks through the voice gateway. (103). Furthermore, the access points and mobile devices can use a number of ways described later to overcome quality problems for voice transmission.

In this system, WiFi phones or mobile terminals (109, 110, 111) are no longer fixed phones anymore, instead, they composed of dual interfaces—wired and wireless WiFi interface together. Wired interface can plug into the LAN directly using a conventional Ethernet cable or through the cradle (121). WiFi interface connects with access points or wireless gateway (112). As "semi-wireless" phones, they can take advantage of both communication methods.

Those WiFi phones (109,110,111) are also smart data terminals that can communicate both voice and data packets at the same time. Both voice and data services can be provided to users. For example, one can browse Internet or play Internet games while talk over the phone at the same time.

To reduce the size of WiFi phone, the wired interface can be moved to the cradle. Traditional cradles of cellular phones or PDA (Personal Digital Assistant such as Palm or Windows CE) are used only for charging or limited communicates to PC (personal computer) by special serial or USB cables. Cradles are not capable of communicating to the network without PC. In this system, cradles can connect to the network directly with the wired network. Through which (125) the WiFi phone, can talk with other devices or servers in the wired LAN (106) in high speed soon as it put back to cradle (110). This is a very useful improvement over traditional usage of cradles. Of course, when off the cradle, they are still connected with the build-in WiFi wireless interface (109).

Although putting wired interface leaves only wireless interface in the WiFi phone and makes it smaller and lighter, however, cradles also lock down the mobile terminals to only one location for connecting to wired network. When size issue is not be a problem, or using all-in-one chips, some WiFi phones (111) can have built-in wired interface so it can plug-into any Ethernet cable and get connected immediately. It can also use POE (Power Over Ethernet) connector to charge the device through the Ethernet cable.

When multiple interfaces are present and connected at the same time (110,111), the WiFi phones can automatically use the best network interface for quality service of voice communication. They are smart enough to allow voice packets and data packets co-exist but also try to ensure performance of voice. Details will be discussed later.

Another important component in this WiFi system is the subscription server (107) that sits on the wired LAN (106). Its main function is to serve as a central place for managing the connection information of all mobile terminals for delivering voice packets with better quality. Every time a WiFi phone or mobile terminal connects or re-connects to the network, either through wired LAN (120) or wireless WiFi by access points (112), the device will send special packets to the subscription server to update its current status, including address, gateways, connections, capabilities, authentication or other information.

Once subscription server (107) updated that information, other devices or voice gateway can lookup to locate the best way to connect the WiFi phone. For example, when external phone (101) wants to call mobile user (109), the call reaches the voice gateway (103) through public telephone network (102). Voice gateway (103) will query the subscription server (107) to get the current status of the target (109). Subscription server then looks up its internal database and returns back to the voice gateway (107) the registered information such as address of the target, whether it should be connected by wired LAN or wirelessly. After that, voice gateway (103) can send other voice packets directly to the WiFi phone (109).

In the case that two WiFi phones within the same LAN network (either wired or wireless) want to talk to each other, the voice gateway (103) is not involved. Two devices can call each other using any VoIP protocol or other protocols. This is similar to the internal calls in a typical PBX system.

The subscription server can also work together with routers and access points in the LAN by globally managing routing policies for better delivery of voice packets. It may calculate number of concurrent voice communication at a time and then send RIP (Routing Information Packet) packets to the corresponding routers for optimum bandwidth allocation. For example, if there are too many mobile devices connected to wireless access point (112), then subscription server may instruct routers connecting to it allocate more bandwidth to ensure QoS of the voice conversation. In the above example, when external call goes in, the system may have already reserved enough bandwidth for the new voice communication between voice gateway (103) and the mobile terminal (109).

In summary, this WiFi phone system is smart and flexible that delivers mobile voice and fast data access to users together. With both wired and wireless interfaces and smart packet selectors, access points and mobile terminals can gain the best out of both wired and wireless communication. Connected with wired LAN, better voice quality can be achieved; connected with WiFi access point, best effort voice communication will be tried. WiFi phones can also freely roam between wired and wireless networks by registering to subscription server. Subscription server can maintain a better environment for voice communication be coordinating, negotiating or adjusting gateways and bridges with routing information packets.

Figure 2:
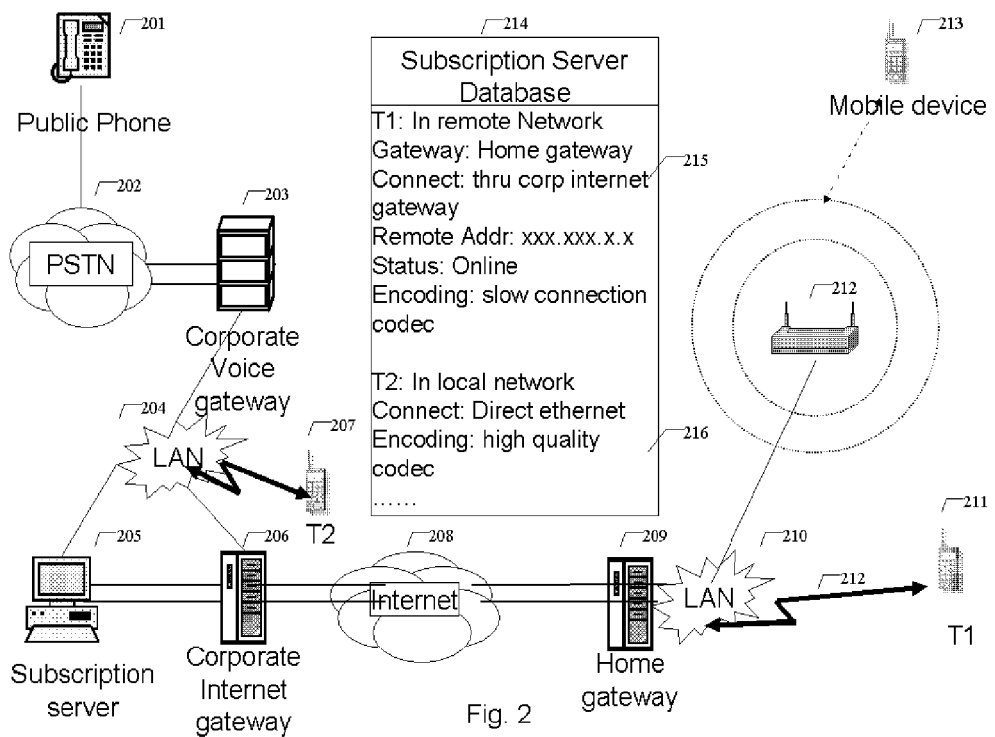
FIG. 2 illustrates the process of using subscription server to allow WiFi phone or mobile terminal move from one location to another location and can still make and receive voice calls.

FIG. 2 illustrates the process of using subscription server to allow WiFi phone or mobile terminal move from one location to another location and can still make and receive voice calls.

Assume original WiFi phone is deployed at corporate network (204), users are able to make and receive phone calls through the voice gateway (203). They can also use the WiFi phones (207) to access Internet (208) through Internet gateway (206) at the same time. With WiFi wireless access points and the quality service enhancement of the system, regardless where they are in the company, they can always get data connection or voice calls.

When a user moves to remote site, such as home network (210), the company network can't be accessed directly. Assume there is Internet connection at home through home gateway (209), he can use regular PC to go online (208). When the WiFi phone (211, 213) is carried from company to home, it (211) can either plug-into the network cable (212) directly or through a network cradle. Then it can access home network as well as the Internet (208) through the home gateway (210). If the network cable (212) is POE cable (Power Over Ethernet), it can also charge the WiFi phone when connected (211).

After connected to the Internet, the first thing WiFi phone or mobile terminal (211) tries to do is connecting to the subscription server (205) in the company LAN through the Internet (208). Of course, if multiple systems are connected together to form a bigger system, it can connect to any subscription server in the Internet. The subscription packet it sends out travels through home network gateway (209), to Internet (208), then arrives at the corporate Internet gateway (206) and finally reaches the subscription server (205).

In this subscription packet, WiFi phone (211) includes its newest address and optionally, the gateway through which it can be reached. When the subscription server (205) receives such information, it will update its internal database (214) accordingly. From then on, the WiFi phone can be reached by this new address instead of its original corporate address.

In subscription server's database (214), a new record (215) about the current status of mobile terminal T1 (211) is appended. For example, T1 is located in the remote network whose gateway is the home gateway (209). It may also include other information such as whether T1 has a public Internet address or private address behind firewall. It may also contain the status such as whether it is idle or busy, supported audio codec, and other communication parameters such as preferred bandwidth.

Once the subscription server (205) recognizes that WiFi phone T1 (211) is now in a remote network and updated the database (215), the system can use those information to redirect any incoming calls to T1 even if it is not in the corporate network. That means the voice services continue to be served. For example, if an external phone (201) calls for T1 (211), it first reaches the corporate voice gateway (203), the voice gateway then queries the subscription server (205) for current status of T1 (211) and discovers that T1 (211) is no longer in the local corporate network (204) but in a remote network (210). It will then use the routing information (215) of T1 to connect to remote gateway (209) through the Internet (208) to reach T1 (211). The remote gateway (209) is responsible for transferring voice calls to the mobile terminal T1 (211).

If there is no QoS support in the home network (210), the voice packets are treated as data packets in the network. Without Quality of Service support, some delays or interrupts might occur during the call, but generally the voice communication can still be conducted. The smart WiFi phone device (211) is backward compatible and can work in network that does not have our proposed enhancement.

If there is also WiFi wireless network at remote side home, then the WiFi phone device (213) can immediately use it for communication as it did in the corporate LAN. Compatible with existing WiFi 802.11 standard, it can still connect to the WiFi gateway (212) with its built-in WiFi interface. Again, it becomes a truly mobile terminal as long as it moves within the range of access points.

It is also possible that WiFi access points or other gateways implement the real-time quality of service proposals, such as using piggy-tail method for speed up packet transmission, using separate queues for voice packets. Then WiFi phone devices (213) can enjoy a better quality of service during voice conversation.

WiFi phone devices (207) inside compare network (204) may have different record (216), which contains similar status information about terminal T2 (207). The main difference is that it indicates that instead of remote site the current device is in the local network so it can be connected directly. There is no internet gateway to go through for this case. As it is within the current WiFi phone system, all the quality improvements are applicable too. With those enhancement and high bandwidth network, voice quality may also be improved by using a high quality codec as well.

The status database (214) maintained by the subscription server (205) is dynamically changed and updated every time a WiFi phone terminal joins the network, roaming from remote site or changes its status. The key is the accuracy of the status. If the status is not up-to-date, the system, including voice gateway may not be able to connect to the terminal when there is new call. This may happen when the WiFi phone terminal (207) is powered off, out of range or in the road to another remote site. For such situations, the voice gateway can redirect the call to the user's voicemail or forward to another number.

To some extent, this scenario is similar to the cellular network roaming mechanism within and between cities. However, there are three major differences from our system: First, our system is based completely on a packet switched data network—LAN, Internet and WiFi wireless network so it supports both data and voice communications simultaneously. Second, our system can work both as a wired system and WiFi wireless system WiFi phone or mobile terminals can be either a wired terminal or mobile terminal depends on whether best performance can be achieved. Third, subscription server is only responsible for voice communication but not data service. Data service can still be provided by each remote site directly for best performance, while in cellular network, everything must go through home location. Of course, if user wants to access corporate network resource remotely, he still needs to go through corporate gateway with VPN support.

This system is also different from traditional mobile IP in 3 ways: First, instead of relying on one IP address, the WiFi phone or mobile terminal can be assigned different address each time it connects via different method or different site. Second, the address that WiFi phone or mobile terminal assigned in any network can be private address. But as long as the gateway is also submitted to the subscription server, the system including the voice gateway can reach the device though gateways. Third, subscription servers can coordinate other parts of the system including other gateways or routers to achieve optimum performance.

Figure 3:
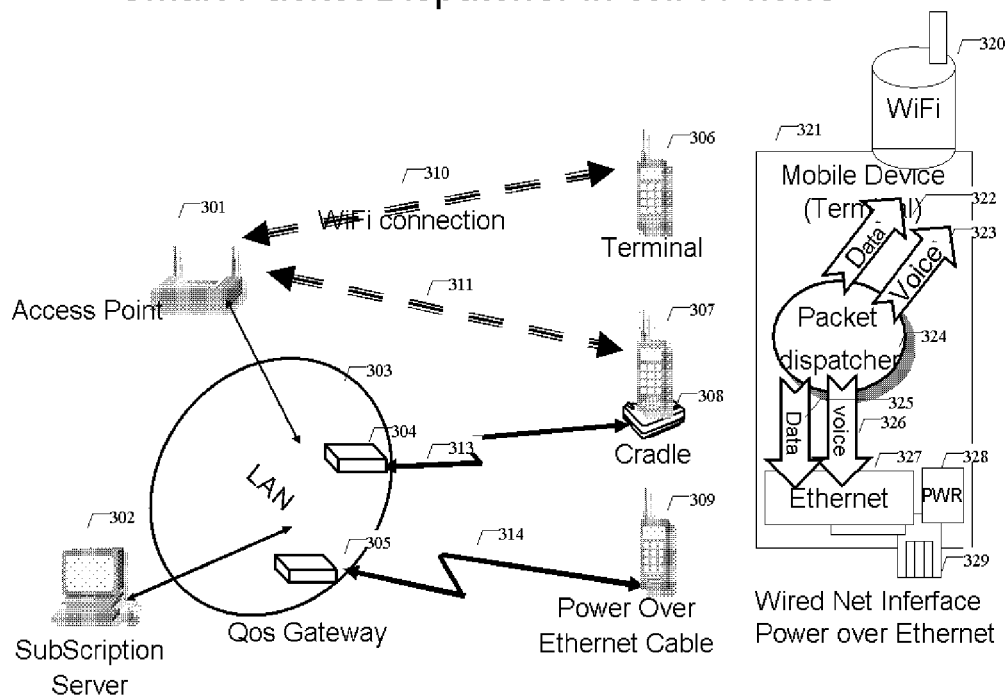
FIG. 3 illustrates how the smart packet dispatcher in the WiFi phone automatically switch between both wired and WiFi wireless interfaces to choose the best connection for quality of voice communication.

FIG. 3 illustrates how the smart packet dispatcher in the WiFi phone automatically switch between wired and WiFi wireless interfaces to choose the best connection for quality of voice communication.

FIG. 3 shows three different connection scenarios for WiFi phones (306, 307, 309). (306) is a mobile terminal on move which connects through WiFi wireless access point (301) only. (307) is a mobile terminal which connects through the wired cable by a cradle (308) while also connecting to the wireless access point at the same time. (309) shows a mobile terminal connected to the LAN directory with its wired interface.

In all these 3 scenarios, the mobile terminals can access data network any time, for example, browse the Internet freely. The difference of the system is that there is an automatic packet dispatcher to balance and select the best connection medium to achieve the best performance of voice communication. Of course, before the voice communicate starts, WiFi phone devices (306, 307, 309) have already detected available connections (wired or WiFi) and registered to the subscription server.

The right side of FIG. 3 shows the internal processing engine of the WiFi phone, or mobile terminal (321) which contains two network interfaces: one is WiFi wireless module (320) and the other is wired network interface which typically is Ethernet card (327). Some times, the Ethernet interface can combine with an optional power module (328) to form a POE (Power over Ethernet) interface (329) that allows charging over the same network cable.

Inside the WiFi phone, there is an automatic packet dispatcher (324) in the network protocol stack, whose main function is to choose which network interface connection to use for sending a particular type of network packet. Traditionally, different network interface is associated with different network address. Normal network applications are bound to a particular network address to communicate with other devices, thus may not be able to switch network interface in the middle as it may change its network address. With the automatic packet dispatcher (324), different packets can be sent using either connection depends on throughput and bandwidth on different interface.

When WiFi phone (306,307,309) is turned on, it searches for the existing network interfaces and register itself to the subscription server (302) in the local area network (303) to update its status such as available bandwidth, preferred voice codec and the associated access point (301) or gateways (304, 305). When there is voice communication, the subscription server may reserve enough bandwidth in the LAN for it by sending routing information to other devices such as bridges or gateways (304,305) along the path from voice gateway to access point (301) to setup a quality route for voice communication to terminal (306).

There are many existing ways to do resource reservation in the wired network so this portion is not our focus. However, as a mobile phone system, WiFi phones cannot stick to a fixed wired cables (313,314), most of the time, voice communications must share the same WiFi channel, wireless connection or wired connection with data access.

One option for WiFi 802.11 communication is to use two channels. One channel is reserved for voice communication and the other is reserved for data communication. This option works best with the dual-channel wireless card and dual-channel access points. By separating voice channel and data channel, voice communications has much less possibility being interrupted by data communication thus the quality is improved. For example, some recent 802.11 access point has both 802.11a (or 802.11g) and 802.11b capabilities and can support dual channel communication. Someday wireless cards for mobile devices may also have such capabilities. But until now this is still an expensive choice.

When both voice and data share the channel, connection or network, conflict and congestion are almost impossible to avoid. In this case, automatic packet dispatcher (324) is used to prioritize data and voice packets. Since voice packets contain real-time data and must have higher priority, otherwise, if voice packets can not be transmitted on time, there will be significant distortion, jitter or other problems in the voice conversation. The worst is that voice communication might be interrupted. On the other hand, regular data packets can have lower priorities, or even being sent and received during idle cycles of network. The drawback is that there are some delays when users are browsing the Internet or sending emails. But those delays are still acceptable since they are not real-time tasks.

There are various ways for prioritize packets. Many operate on a single layer of network communication. For example, on MAC layer (layer 2), IEEE 802.1p (and IEEE 802.1q) standard specifies an extra field for the Ethernet MAC header called Tag Control Info (TCI) field. This field contains a 3 bit priority field that is used for priority handling to define 8 different levels of priority. On IP layer (layer 3), recent standards known as Differentiated Services (Diffserv, RFC 2474), partition the ToS (Type of Service) field into two fields: DSCP (6 bit) and CU (2 bit). The DSCP field is used to determine the required priority.

However, not all those solutions work for the wireless world, in particular, WiFi 802.11. For example, TCI support on 802.11 is still not available. In our system, we apply different solution for wireless and wired connection, and use the packet dispatcher to intelligently switch among them to achieve the best of both solutions. This is different from traditional solution that works on a single network layer or interface. Wired interface can use traditional solution while wireless side can use our piggy-tail and other methods that will be discussed later. The smart packet dispatcher (324) is used to glue solutions together.

The smart packet dispatcher (324) associate two different types of queues to both wired interface (327) and WiFi wireless interface (320). One is the real time voice queue (322, 326) and the other is regular data queue (322, 325). So there are totally 4 queues: 2 for wired interface (325,326) and 2 for wireless interface (322,323). In general, packet dispatcher will always try to finish processing real-time voice packets in the voice queue (323, 326) prior to the non real time packet queue (322, 325). By doing so it can ensure voice packets have much better response time and less latency.

Furthermore, in case of network congestion, it can even selectively drop unimportant packets in some queues to speed up the process. For instance, if voice queues are full, it can selectively drop the out-of-date packets since even if it can be delivered later, it can not be played. Also, dropping one of the two consecutive packets may only cause a small quality loss. Some other unimportant packets, such as duplicate ICMP (ping) packet may be dropped in case of congestion. This self-cleaning feature will improve system response. On the contrary, if some voice packets are very important packets, it can send it twice via both interfaces and see which one reaches destination first. as long as both communication parties understand it and can drop the duplicate packets.

Among the two network interfaces, the smart packet dispatcher (324) put voice packet to the faster interface for faster delivery. Since most of time, wired network is much faster and more reliable than wireless network, the packet dispatcher (324) will first put voice packets to the voice queue (326) on wired interface (327) and empty it first. Similarly, data packets go first to the data queue of wired interface (325) if possible. If wired network in congested, then data packets go through wireless interface (322) to avoid potential conflict with voice communication. The voice queue on wireless side (323) will be used if wired communication encounters severe congestion problems. Anyway, the smart packet dispatcher is responsible for coordinating different packets of the WiFi system among different interfaces to ensure quality of voice conversation.

In the first scenario (306) where WiFi phone does not connect with wired cable, the only available network interface is the WiFi wireless interface (310) associated with access point (301).

In the second scenario (307), the WiFi phone (307) sits on a cradle (308) through which connects to the hub or bridge (304) with a network cable (313). The cradle can also provide additional corporate phone functionality such as charging, speaker phone, nicer display and dialing capabilities. In this case, both network interfaces are enabled and the smart packet dispatcher can work fulltime taking advantage of both interfaces.

In the third scenario (309), the mobile terminal (309) is connected to the network cable directly (314). If there is no access point available, the wireless network interface (320) is disabled. It is more like traditional VoIP phones. If the access point is available, this is also similar to the second scenario (307).

In all the above scenarios, when mobile terminals (306, 307, 309) are connected to the access points, hubs or bridges (301, 304, 305), their current connection status is updated on the subscription server (302). Other parts of the system, including other WiFi phone devices and voice gateways, can send voice packets using the faster and preferred connection.

The smart packet dispatcher is a module inside the network stack so it works on all different network types. The work it did is transparent to users or voice applications in the device. To users and applications, there seems to be only one connection and it is the smart packet dispatcher that automatically switches on and after interface has changed when phones switch access points, unplug or replug the cable.

The smart packet dispatcher (324) can not only be used on WiFi phone or mobile terminals, but can also be used in a dual interface access points or gateways. This way, voice communications are given more special treatments so that quality of voice could be improved further.

Figure 4:
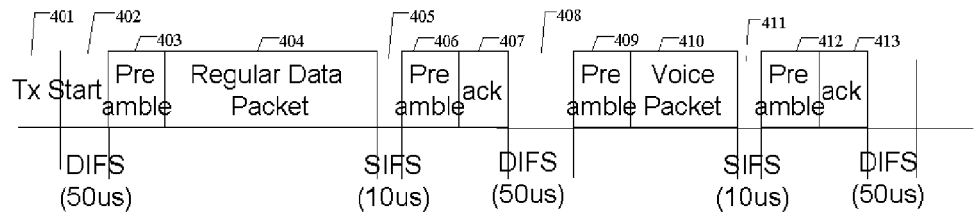
FIG. 4a illustrates the flow chart for sending a data and voice packet using standard 802.11 protocols.
FIG. 4b illustrates the flow chart for sending piggy-tail real time voice packet to a regular data packet.
Figure 4:
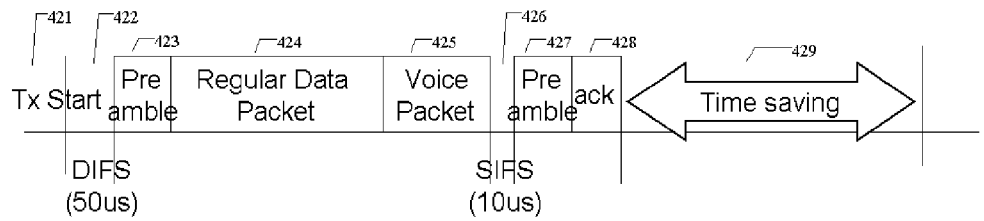

FIG. 4 illustrates the piggy-tail method to improve quality of service for voice communication under 802.11 by piggy-tail real-time voice packet to a regular data packet.

The 802.11 family uses a MAC layer known as CSMA/CA (Carrier Sense Multiple Access/Collision Avoidance) while Classic Ethernet uses CSMA/CD—Collision Detection). CSMA/CA is, like all Ethernet protocols, peer-to-peer (there is no requirement for a master station).

In CSMA/CA a wireless node that wants to transmit performs the following sequences: 1. Listen on the desired channel.

2. If channel is idle (no active transmitters) it sends a packet.

3. If channel is busy (an active transmitter) node waits until transmission stops then a further contention period. (The contention period is a random period after every transmit on every node and statistically allows every node equal access to the media. To allow tx to rx turn around the contention time is slotted 50 micro sec for FH and 20 micro sec for DS systems).

4. If the channel is still idle at the end of the contention period the node transmits its packet otherwise it repeats the process defined in 3 above until it gets a free channel.

FIG. 4a illustrates the flow chart of using standard 802.11 protocols to send a data frame. Assume that there is no conflict or contention involved in the process.

In this picture, before a mobile device or base station wants to send a data packet (404), it waits until the last transmission is finished (401) for the period of DCF Inter Frame Space (DIFS) (402). Then it listens on the desired channel for access. If it is idle, there is no contention window, it can send the data packet in 802.11 MPDU (MAC Protocol Data Unit).

A regular 802.11 packet is composed of preamble header (403) and actual data portion (404). Once the transmission is finished, it waits for a period of Short Inter Frame Space (SIFS) (405) before continuing.

At the end of every packet, if the receiver has successfully receives the packet, it will return an ACK packet. If the receiver does not receive or receives with errors, it will not respond anything. There is no NACK to indicate errors. If no ACK is received within predefined timeout period, the sender will retry the transmission using the same CSMA/CA procedure until either success or abandoned after exhausted retries.

The ACK packet is also a regular 802.11 data packet—MAC Protocol Data Unit (MPDU) composed of a preamble (406) and the actual ACK data (407). This finishes the transmission of a regular data packet in 802.11.

After this regular data packet (such as TCP data packet), assume there is another real time voice data packet so the same process happens again. The sender waits for the DIFS (408), and then sends the preamble (409) before actual voice packet (410). After a SIFS period (411), it receives an ACK packet from receiver composing of the preamble (412) and the ACK data (413).

In this process, there are several wait periods and multiple transmission of preamble headers. They waste a lot of bandwidth and reduce the throughput. If there are voice packets in the queue, they have to wait until previous packets are transmitted so the delay is inevitable. Things could get worse if there are multiple stations competing for the turn to transmission in the contention window.

So, even we already applied the smart packet dispatcher and prioritize packets for coordinate wired and wireless transfers, those delays and latencies are introduced in the WiFi MAC layer and cannot be resolved by prioritization. FIG. 4b shows a new method our WiFi phone system uses to speed up transmission of real time voice packet and increase the throughput of the WiFi wireless network.

As compared with FIG. 4a, in FIG. 4b, before sending a regular data packet, if there is an urgent voice packet coming, and we send the real time voice packet as a piggy-tail part of the regular data packet, there is huge bandwidth saving (429) we can achieve.

In the past, piggy-tail method is only used in sending back ACK in some network communication. In this invention, we use it to the real time voice communication for WiFi wireless network. In this method, we append real time voice packet (425) at the end of a regular data packet (424) and send them together in one WiFi transaction.

When the process starts (421), it waits for the DIFS period (422), assuming there is no contention window, it starts the MPDU, which is composed of the preamble header (423), regular data packet (424) and the voice packet (425). After the receiver successfully receives the packet, it waits for the SIFS (426) period, then sends back the ACK packet (428) with preamble (427) to finish the process. From this we can clearly see that there is significant time saving (429) compared with FIG. 4a where we have to transfer one packet after another.

On first glance, some may argue that this piggy-tail method is a contradiction to the traditional wireless network fragmentation technique. Because of large bit error rate in wireless environment, traditional wireless network transmission tries to separate network transference to smaller blocks.

For example, wireless systems bit error rate is typically $10^{-5}$ to $10^{-6}$ which is substantially higher than wireline systems ($10^{-12}$). Large blocks may approach the number of bits where the probability of an error occurring may=1, i.e. every block could fail including the re-transmission.

To reduce the possibility of this happening, large blocks may be fragmented by the transmitter and reassembled by the receiver node. For instance, a 2500 byte block (20,000 bits) may be fragmented into 5 blocks of 500 bytes (4,000 bits). This is the fragmentation technique used to reduce both the probability of an error occurring and the re-transmission time in the event of an error.

This seems to be contradictory to our piggy-tail method where the packet size is actually increased. But this is exactly where the novelty comes from. The answer lies in the fact that both methods—traditional fragmentation technique and our piggy-tail method—have its advantages and disadvantages. Fragmentation technique is good in an environment with high error bits rate. However, if each fragment is too small, like smaller than 100 bytes, it is waste of the resource and bandwidth further, too small packets need more transmission and headers which might further increase the possibility of error rates.

Our piggy-tail method, although may increase size of one packet, does works well in an environment where bits error rates are low and there is need for quicker response time and fast packet delivery. Of course, our method has a limit we should not use it for big packets otherwise, the new packet size would be too big. However, according to our analysis before, normal voice packets are small enough (such as GSM uses 33-65 bytes), that's the reason why our method should work well for increasing bandwidth usage and throughput.

In reality, our piggy-tail method can be combined with the fragmentation technique to include the benefits of both techniques. For example, if there is a 2500-bytes data packet to be transmitted, it is divided into 5 smaller 500-bytes blocks, and there is a 70-bytes voice packet arrived after the first 500-bytes data block is transmitted.

It is possible to piggy-tail the 70-bytes voice packet with the 2nd 500-bytes data block. So the total transmission sequences will be 500-bytes (data), 570-bytes (data+voice), 500-bytes (data), 500-bytes (data), 500-bytes (data). In this case, the voice packet is delivered without having to wait for the whole 2500 data packet finished transferring. In reality, piggy-tail method is even more efficient with many smaller data packet such as TCP ACK packet, HTTP header packet, which itself is small enough. For those smaller packets, appending additional small voice packet is still smaller enough and within the maximum transference block. It won't increase the error rate or the possibility of conflict too much.

As we discussed, the limit for our piggy-tail method is that it cannot be used for large packet because of error rate increasing and the potential to exceed the maximum packet size (2312 bytes) allowable in WiFi 802.11. This may not be a big deal since most voice packets are small enough when they are compressed. For example, a GSM voice segment for 40 ms (milliseconds) is only 65 bytes. Some other codec may even produce smaller packet.

Even for larger block of voice packet, there is a work around—fragmentation. Just split the large voice packet into multiple smaller voice packets and then transmit them one by one using the piggy-tail method.

Since the piggy-tailed packet actually contains two packets, it may contain a special flag in the header to distinguish from regular packets. The receiver party must be able to disassemble the piggy-tail packet to the original packets and deliver to their original destination after receiving. Thus, this piggy-tail method requires that both access point and mobile terminal change their network stack processing logic to recognize this new method. However, simply disabling piggy-tail method and using standard 802.11 protocols will allow those unsupported access points or devices still to work in this environment, Access points and WiFi phones can determine their capabilities by looking up the subscription server for the capabilities. An alternative or lighter solution is that a capable mobile terminal can notify the access point directly for its enhanced capability by sending a custom packet to custom port. Once received the packet, the access point can turn on the piggy-tail packet processing for the enhanced device. Packets send to other standard 802.11 devices do not use the piggy-tail methods so that compatibility is maintained.

This method can be generalized to any kind of wireless packet transmission that uses peer to peer collision detection method as long as there is large overhead and waste in transmitting multiple smaller blocks instead of one larger block of data.

In addition, this WiFi phone system can use other unique ways to improve the real-time responsiveness for the system. Those include: smaller back-off time on collision; intelligently postponing sending ACK frames by increasing ACK timeout value or using NACK instead of ACK for voice packets under good network connections.

When a mobile station (access points and WiFi phone) are sending high priority voice packets, the access point or device may automatically use a smaller back-off time in case of collision. Smaller back-off time means the less time to wait for until retry and thus can increase the possibility for it to gain control of the channel to send the voice packet as soon as possible. This technique can be used independently by either access points or mobile terminals.

Figure 5:
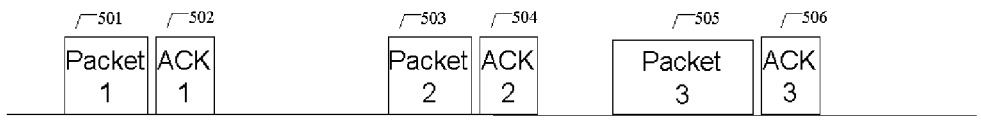
FIG. 5a illustrates the normal ACK in 802.11 protocol for transferring regular data packet.
FIG. 5b illustrates the intelligent ACK/NACK for transferring voice packets
Figure 5:
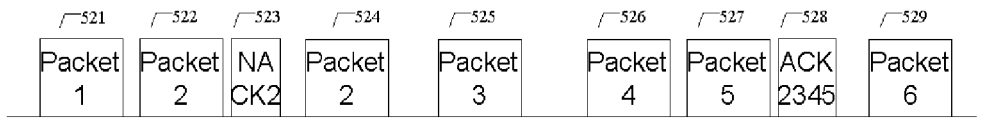

As shown in FIG. 5a, in rush hours, ACK packets are really big bottlenecks for the whole system throughput. In normal 802.11 protocol, transferring each data packet (501, 503, 505), has to stop and wait for acknowledge packet (502,504, 506) before it can be continued.

We can reduce the transmission of ACK packets by postponing the sending of ACK and increasing the timeout for waiting ACK before it consider unsuccessful transmission. The receiver does not need to send ACK immediately but can wait until later when the system is idle. For some isochronous voice packets, it is OK to drop the packet instead of re-transmission for too many times as long as the receiver can compensate for the loss of such packet since the total throughput is more important than a single packet.

FIG. 5b shows an intelligent way for combination the ACK and NACK (acknowledge only if there is error in transmission) depending on packet types and connection conditions. Instead of acknowledge of every successful transmission, NACK is sent only on errors. However, there is a problem with NACK that is: what if the receiver does not receive the packet at all? ACK is used after a certain number of packets finished transferring to re-confirm the connection between sender and receiver. This is called group size.

When the group size is 1, this is the same as traditional ACK method as there is one ACK after each packet. However, when the connection is good, the sender and receiver can use a larger group size. This means, ACK is sent after a group of packets are transmitted successfully and NACK is sent on where there is error. In FIG. 5b, group size is 4, packet 1 (521) is transmitted successfully so there is no NACK. However, packet 2 (522) was received with error, so immediate NACK (523) is sent back and the sender resend packet 2 (524). Later, other packets, packets 3, 4, 5 all succeed (525,526,527). At that time, the receiver will send an ACK (528) to notify the success for this group of packets packet 2,3,4,5. And the group reset again. After that, next group of packets (529) are transmitted again.

In the ACK/NACK packets, sequence numbers or bit masks can be used to notify packets that are missing, bad or successfully received. NACK can also being sent during the SIFS period so that it can reduce conflicting. In the case that there are networking or communication problems, since no ACK is received after group size for a timeout period, the sender can send a special connecting packet to the receiver asking for confirmation of ACK or NACK. And it can try to reduce the group size to compensate for the bad network connection.

The group size is changed at real-time by both parties in the ACK/NACK packet based on current packets type and network connections. For example, when many voice packets are queued, the group size can be increased as they are more urgent to be sent ASAP. The receiver can even drop some erroneous voice packets for fast delivery. When there are more data packets and network condition is bad, group size can be reduced, even down to 1, which is the normal 802.11 protocol mode. This is also where the compatibility stands: if the other end is standard 802.11 device, simply setting group size to 1 should work.

In general, this WiFi phone system and methods described here provide a flexible environment for enabling both voice and data communications to co-exist by maximize the best side of both wired and wireless networks. Although WiFi wireless is on discussion system, this system and methods can be applied to other digital wireless network as well.

The various features of novelty which characterize the invention are pointed out with particularity in the claims annexed to and forming a part of the disclosure. For a better understanding of the invention, its operating advantages, and specific objects attained by its use, reference to the drawings and descriptive matter in which there are illustrated and described preferred embodiments of the invention.

The invention claimed is:

1. A WiFi phone system capable of providing voice calls over either a WiFi wireless network or a wired network and of allowing WiFi phone devices to freely move within a group of networks comprising:

WiFi wireless access points coupled to each other through a network;

WiFi phone devices with built-in wired and WiFi wireless interfaces, wherein:

said WiFi phone devices allow real time phone conversations directly through either the wired or the WiFi wireless interface; and said WiFi phone devices automatically switch to said wired interface to conduct real-time bidirectional phone calls if said WiFi phone devices are attached to said wired network and wherein said WiFi wireless interface continues to be used as a secondary communication channel;

otherwise, said WiFi phone devices switch to said WiFi wireless interface to place phone calls, and transmit and receive voice and data packets simultaneously;

a voice gateway coupled to either of the network, wherein said voice gateway is capable of:

placing, routing and receiving external phone calls through said wired interface if said WiFi phone devices are attached to said wired network; and placing, routing and receiving external phone calls through said WiFi wireless interface if said WiFi phone devices are only connected through said WiFi wireless network; and a subscription server operated to maintain a status of each of the WiFi phone devices wherein:

each of said WiFi phone devices notifies said subscription server when they move to another network within said group of networks;

said subscription server updates a location for each of said WiFi phone devices; and said subscription server notifies said voice gateway and said WiFi wireless access points in the group of networks of updated location of each of said WiFi phone devices to switch the routing of incoming calls and a transmission and receipt of both voice and data packets; and a smart packet dispatcher in said WiFi phone device operated to improve response time for real time packets by setting up two queues, one for voice or real time packets, and the other for regular data packets, the smart packet dispatcher emptying the voice or real time packet queue before the regular data packet queue so that the voice or real time packets are delivered with improved response time.

2. The WiFi phone system of claim 1, wherein said voice gateway is operated to bridge an external phone network to the group of networks.

3. The WiFi phone system of claim 1, further comprising a data gateway coupled to the group of networks and operated to bridge an external data network to the group of networks.

4. The WiFi phone system of claim 1, wherein the WiFi wireless access points support different 802.11 wireless protocols selected from among 802.11b, 802.11a or 802.11g.

5. The WiFi phone system of claim 1, wherein the wired interface can be implemented by a cradle connected to the group of networks directly, or by a built-in network card with an Ethernet or POE (Power over Ethernet) connector, or other wired network connector.

6. The WiFi phone system of claim 1, wherein the WiFi phone devices are operated to automatically switch between the WiFi wireless interface and the wired interface based on connection speed.

7. The WiFi phone system of claim 1, wherein the wired and wireless interfaces include WiMAX, GSM, CDMA, 3G or other cellular phone interfaces.

8. The WiFi phone system of claim 1, wherein voice calls over the group of networks use Voice over IP technology.

9. The WiFi phone system of claim 1, wherein the subscription server maintains a database to keep track of a current status of each of the WiFi phone devices, the current status including IP address, MAC address, and access point, the database being updated when each of the WiFi phone devices changes its status.

10. The WiFi phone system of claim 1, wherein the subscription server provides a means for locating each of the WiFi phone devices in the case of an incoming call.

11. The WiFi phone system of claim 1, wherein the subscription server can direct calls to use more reliable or faster routers in the group of networks for better performance and send routing information packets to the routers of the group of networks to achieve quality of service.

12. The WiFi phone system of claim 1, wherein each of the WiFi phone devices is operated to send the subscription server an updated status.

13. The WiFi phone system of claim 1, wherein the subscription server is operated to monitor each of the WiFi phone devices and update its status.

14. The WiFi phone system of claim 1, wherein the WiFi wireless access points and the WiFi phone devices utilize QoS (Quality of Service) to prioritize voice packets.

15. The WiFi phone system of claim 1, wherein the voice gateway is operated to consult with the subscription server to locate a WiFi phone.

16. A WiFi phone device capable of making voice calls over either a WiFi wireless network or a wired network and capable of freely moving within a group of networks comprising:

a built-in WiFi wireless interface and a built-in wired interface, wherein:

said WiFi phone device automatically switches to said wired interface to allow real time bidirectional phone calls if said WiFi phone device is attached to said wired network;

said WiFi phone device automatically routes to said WiFi wireless interface to place phone calls if said WiFi phone device is not connected to said wired network; and a component operated to automatically switch between the WiFi wireless interface and the wired interface for both voice calls and data communications wherein:

said WiFi phone device notifies a subscription server when it moves from one network to another network;

said subscription server maintaining and updating a location of said WiFi phone device;

said subscription server notifying a voice gateway in the group of networks of said location change of said WiFi phone device to route incoming calls and to transmit and receive both voice and data packets simultaneously, wherein said voice gateway is capable of:

placing, routing and receiving external phone calls through said wired interface if said WiFi phone device is attached to said wired network; and placing, routing and receiving external phone calls through said WiFi wireless interface if said WiFi phone device is only connected through said WiFi wireless network; and a smart packet dispatcher in said WiFi phone device operated to improve response time for real time packets by setting up two queues, one for voice or real time packets, and the other for regular data packets, the smart packet dispatcher emptying packets in the voice or real time packet queue before the regular data packet queue so that the voice or real time packets are delivered with improved response time.

17. The WiFi phone device of claim 16, wherein the wired interface is implemented by a cradle connected to the group of networks or by a built-in network card with Ethernet or a POE (Power over Ethernet) connector or other wired network connector.

18. The WiFi phone device of claim 17, wherein the cradle can be used for charging the WiFi phone device and as a network connector.

19. The WiFi phone device of claim 17, wherein a POE cable can be used for charging the WiFi phone device and as a network connection with a simple plug-able connector.

20. The WiFi phone device of claim 16, wherein the WiFi phone device is capable of running a mobile application simultaneously with a voice call.

21. The WiFi phone device of claim 16, wherein the WiFi phone device uses a mobile operating system including Palm OS, Windows CE, Symbian, embedded Linux or any other embedded system.

22. The WiFi phone device of claim 16, wherein the WiFi phone device is compatible with Voice over IP phones when connected through the wired interface.

23. The WiFi phone device of claim 16, wherein every time the WiFi phone device changes mode or detects an environmental change, the WiFi phone device sends a notification to the subscription server to update its current status, the current status including its location, address, gateway or access point.

24. The WiFi phone device of claim 16, wherein the smart packet dispatcher is operated to determine the priority of a packet by its header, port number or DSCP (Differentiated Services Code Point) field in the IP header of the packet.

25. The WiFi phone device of claim 16, wherein the WiFi wired interface extends to a non-WiFi wireless interface selected from among GSM, CDEMA, 3G or other cellular interface.

26. The WiFi phone device of claim 16, wherein the WiFi wireless interface extends to a packet switched wireless interface selected from among WiMAX, GSM, CDMA, 3G or other cellular interface.

27. A method of piggy-tailing voice or real time packets with regular data packets in an 802.11 wireless WiFi network to reduce extra overhead, waste, latencies and to improve quality of service between two machines in a single device with both built-in WiFi wireless and wired interfaces comprising the steps of:
    setting up a regular data packet queue and a voice or real time packet queue;
    a sender finding a small regular data packet from a data packet queue that contains data packets to be sent, the small regular data packet having a smaller size than a frame size, said sender determining a remaining space from the frame size;
    said sender locating a voice or real time packet from a voice or real time packet queue that contains voice or real time packets to be sent;
    if the size of said voice or real time packet is larger than the remaining space then:
    said sender splitting said voice or real time packet into multiple small packets
    otherwise, said sender keeping the voice or real time packet intact;
    said sender appending each of said multiple small packets or said intact voice or real time packet to the small regular data packet to form a larger packet;
    said sender adding special flags in the larger packet header to denote the larger packet as a piggy-tailing packet; and
    a receiver of said larger packet re-assembling the voice or real time packets from the received larger packet based on the special flag in the packet header.

28. The method of claim 27, further comprising determining if the voice or real time packet is large or small and splitting the voice or real time packet into multiple small packets only in the case where the voice or real time packet is large.

29. The method of claim 27, wherein the regular data packet includes IP, TCP, UDP or other Internet packets.

30. The method of claim 27, wherein the voice or real time packets are UPD, RTP, or other real time packets.

31. The method of claim 30, wherein the voice or real time packets are recurring small packets that require immediate delivery.

32. The method of claim 27, further comprising detecting the voice or real time packets by looking up a header including a port number.

33. A method of reducing extra overhead and improving response time for voice or real time packets in a 802.11 wireless protocol in a single device handling both voice or real time packets and regular data packets comprising the steps of:
    determining the majority type of packets to be delivered by the network;
    if the majority type of packets to be delivered is voice or real time packets, announcing within a WiFi network the use of a smaller back-off waiting time when there is collision between WiFi access points and devices;
    postponing sending 802.11 ACK packets by specifying a larger timeout value;
    sending ACK packets after receiving a group of packets, the group size being based on the types of packets and connection conditions; and
    sending a NACK packet for each packet error;
    otherwise, if the majority type of packets to be delivered is regular data packets;
    announcing within the WiFi network the use of a regular waiting time when there is collision between WiFi access points and devices;
    using a regular ACK timeout value;
    using a regular ACK mechanism; and
    stopping the use of NACK packet for each packet error.

34. The method of claim 33, further comprising detecting the voice or real time packets by looking up a header including a port number.

35. The WiFi phone system of claim 1, wherein backward compatibility is achieved by reducing a group size to 1.

36. The WiFi phone system of claim 1, wherein the WiFi phone device or access point is further operated to improve voice communication performance by piggy-tailing the voice or real time packets with the regular data packets in an 802.11 wireless WiFi network to reduce extra overhead, waste, and latencies.

37. The WiFi phone system of claim 1, wherein the WiFi phone device or access point is further operated to improve quality of service by specifying smaller back-off time on collision for voice or real time packets transferred between the WiFi phone device and the WiFi access points.

38. The WiFi phone system of claim 1, wherein the WiFi phone device or access point is further operated to improve the voice communication performance by specifying a larger timeout value to postpone 802.11 ACK packets.

39. The WiFi phone system of claim 1, wherein the WiFi phone device or access point is further operated to improve the voice communication performance by sending ACK packets after receiving a group of packets, the group size being based on the types of packets and connection conditions.

40. The WiFi phone system of claim 1, wherein the WiFi phone device or access point is further operated to improve the voice communication performance by sending a NACK packet for each packet error.

41. The WiFi phone device of claim 16, wherein the WiFi phone device is further operated to improve the voice communication performance by either piggy-tailing the voice or real time packets with regular data packets to reduce extra overhead, waste, and latencies or by reducing ACK acknowledgment through larger timeout value usage of NACK.

* * * * *